Sept. 2, 1952 E. A. TESCH, JR 2,609,110
JAR LID REMOVING MECHANISM FOR DRYING OVENS
Filed Aug. 11, 1949 14 Sheets-Sheet 2
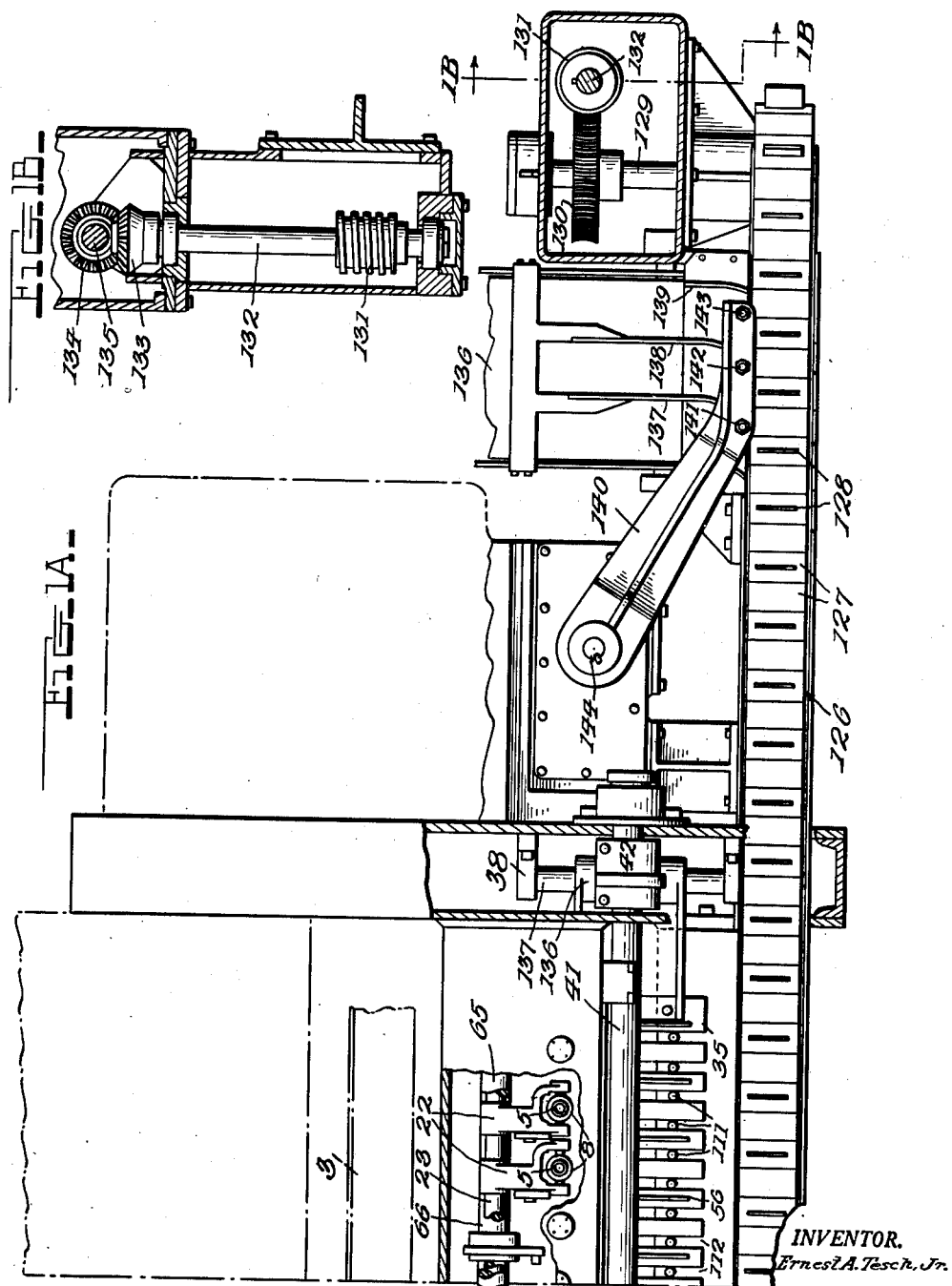
INVENTOR.
Ernest A. Tesch, Jr.
BY Mason, Porter, Diller & Stewart
attys.

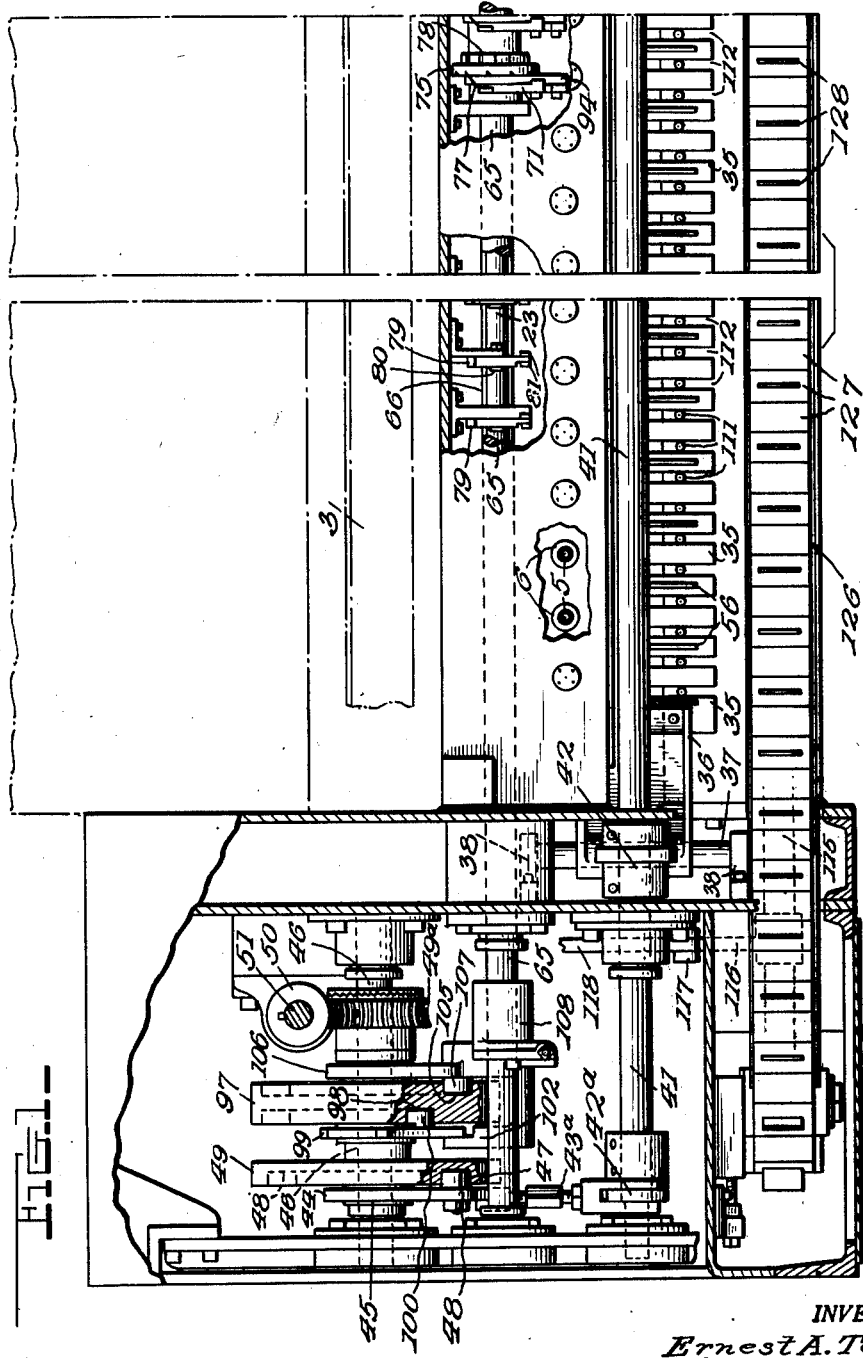

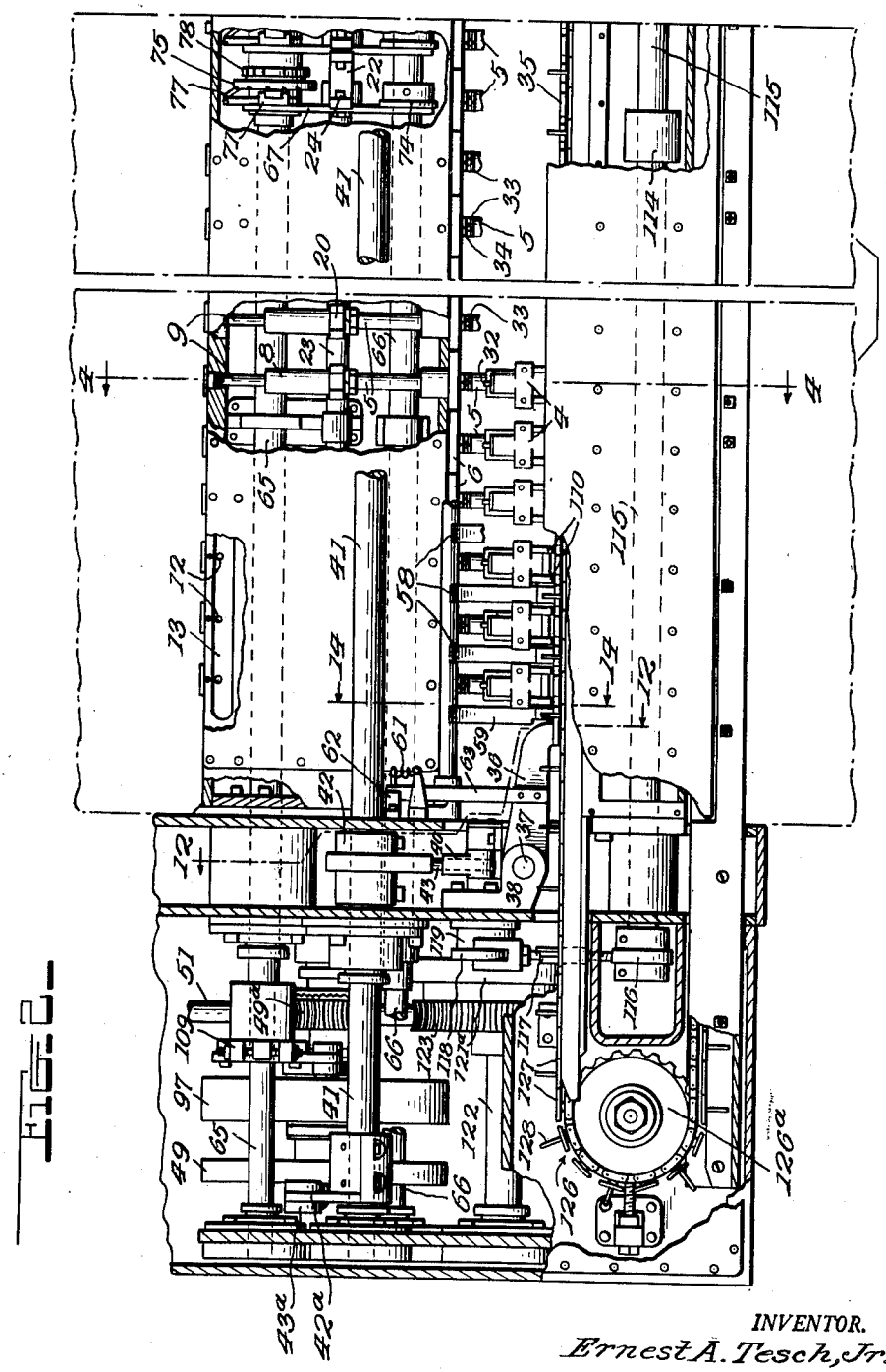

Sept. 2, 1952  E. A. TESCH, JR  2,609,110
JAR LID REMOVING MECHANISM FOR DRYING OVENS
Filed Aug. 11, 1949  14 Sheets-Sheet 4

INVENTOR.
Ernest A. Tesch, Jr.
BY
Mason, Porter, Diller & Stewart
attys.

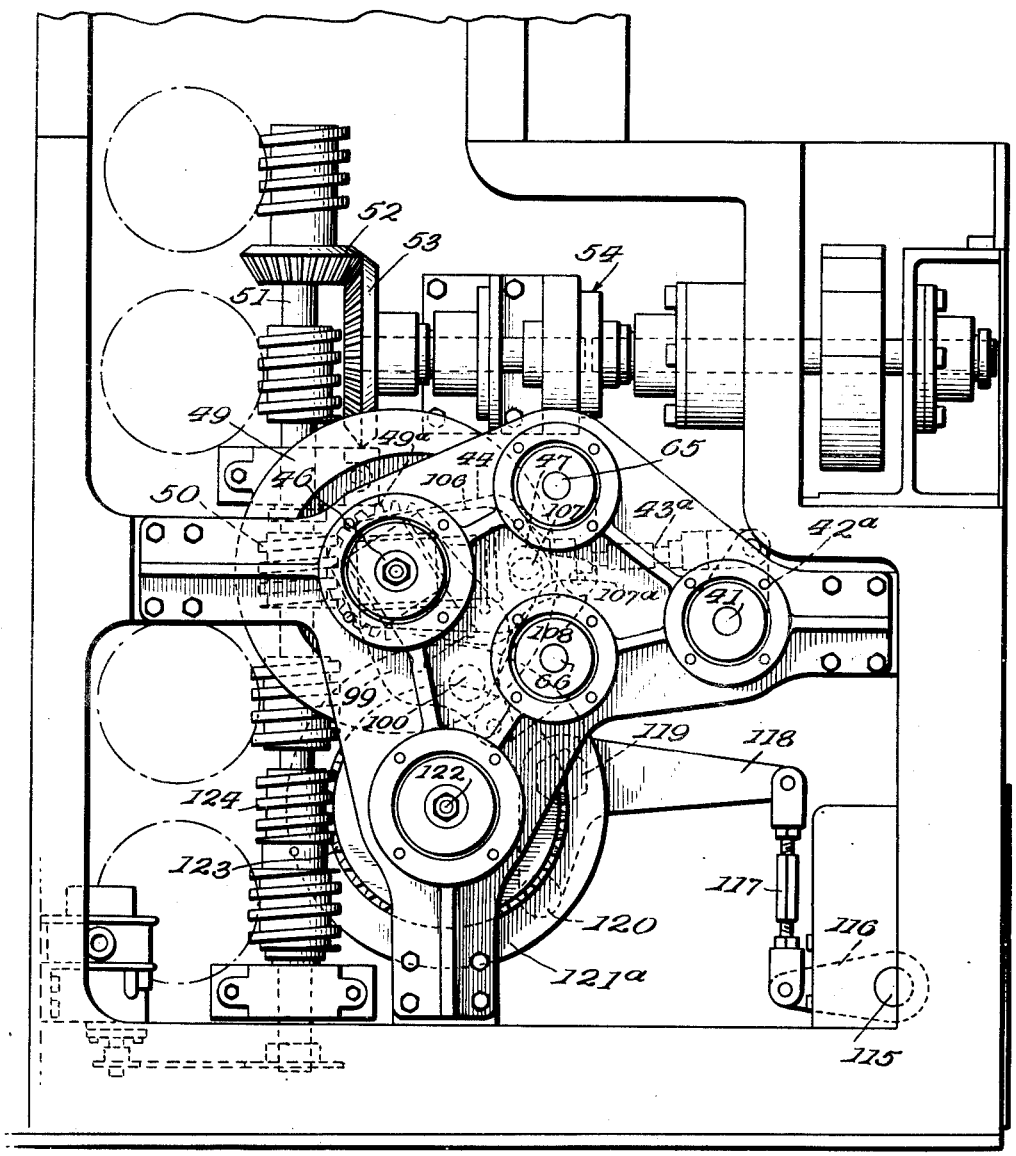

Sept. 2, 1952　　　　　　E. A. TESCH, JR　　　　　2,609,110
JAR LID REMOVING MECHANISM FOR DRYING OVENS
Filed Aug. 11, 1949　　　　　　　　　　　　　14 Sheets-Sheet 6

INVENTOR.
Ernest A. Tesch, Jr.
BY
Mason, Porter, Diller & Stewart
attys.

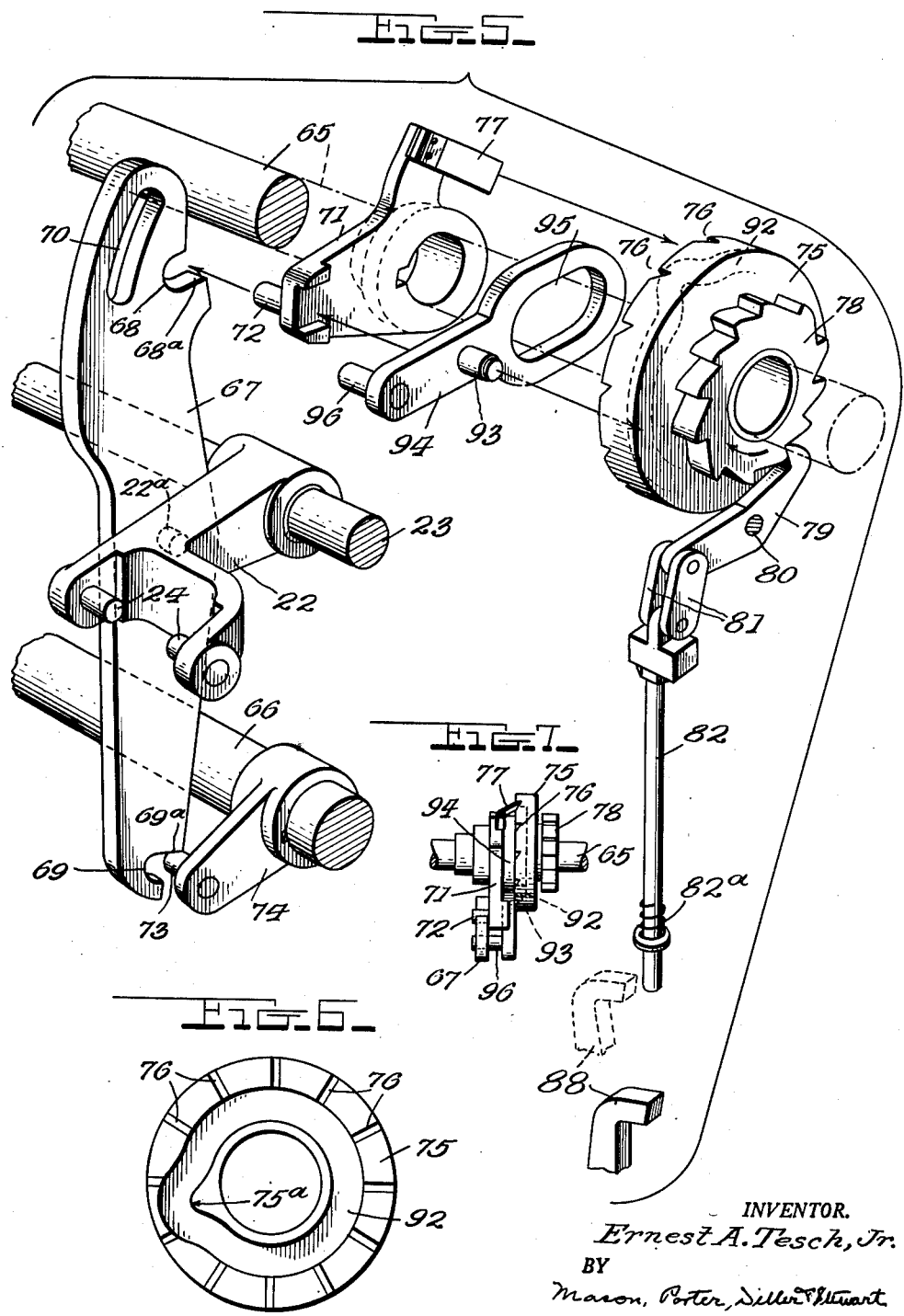

Sept. 2, 1952     E. A. TESCH, JR     2,609,110
JAR LID REMOVING MECHANISM FOR DRYING OVENS
Filed Aug. 11, 1949     14 Sheets-Sheet 8
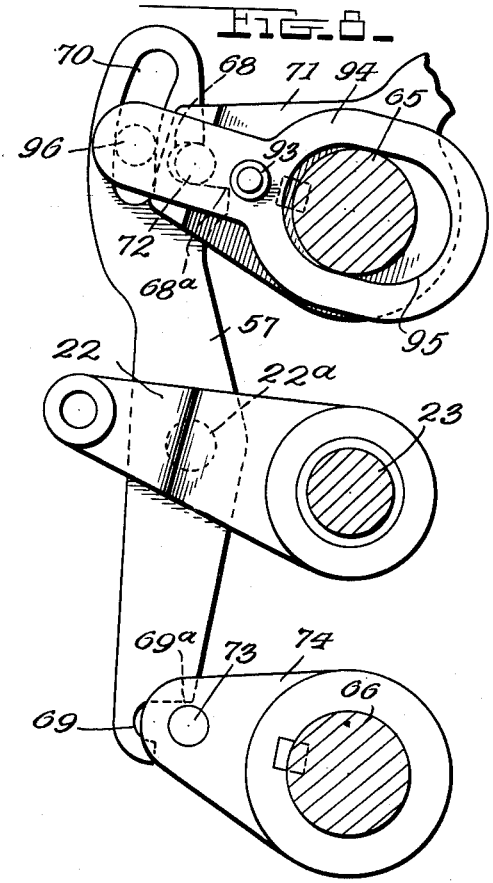
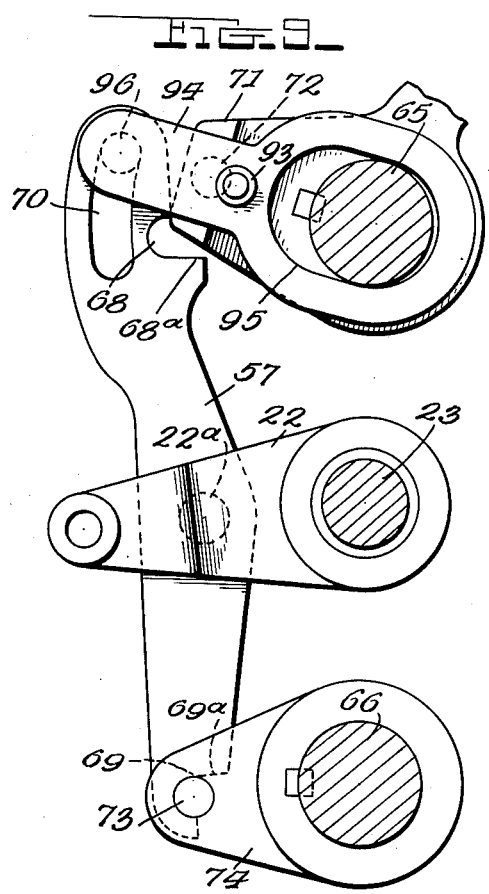
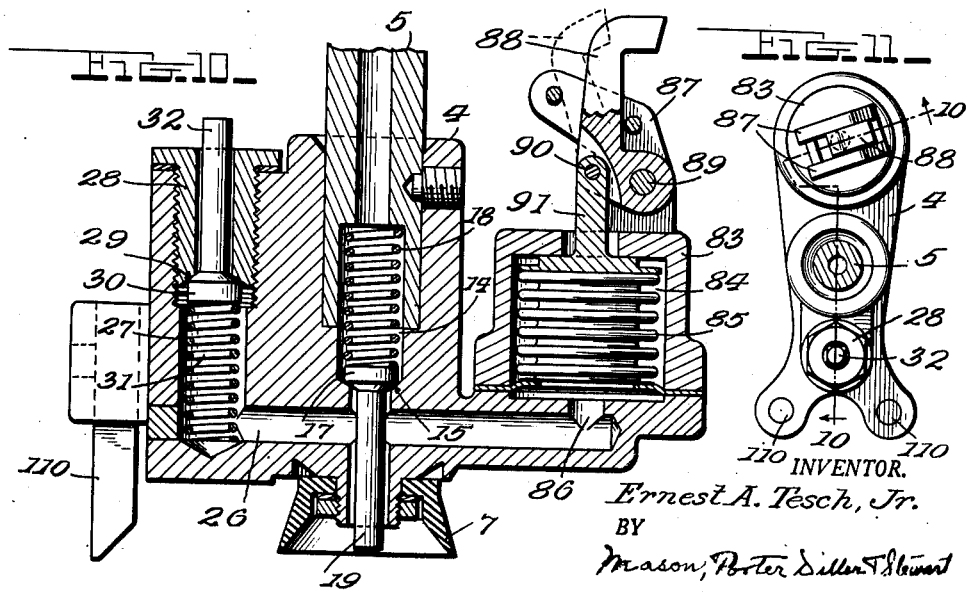
INVENTOR.
Ernest A. Tesch, Jr.
BY Mason, Porter, Diller & Stewart
attys.

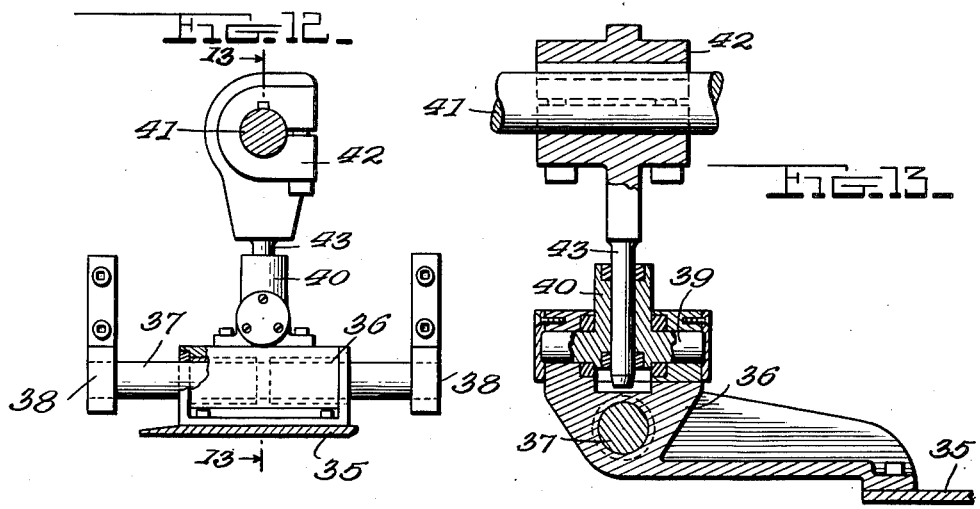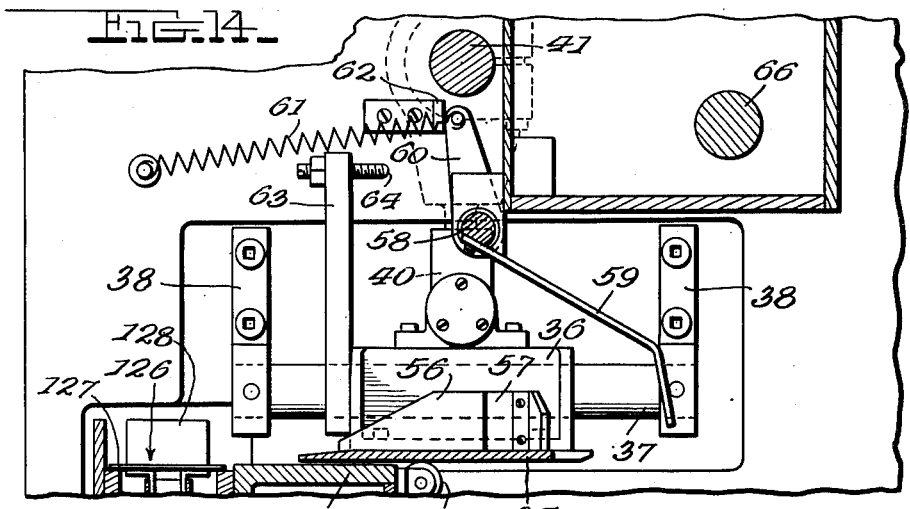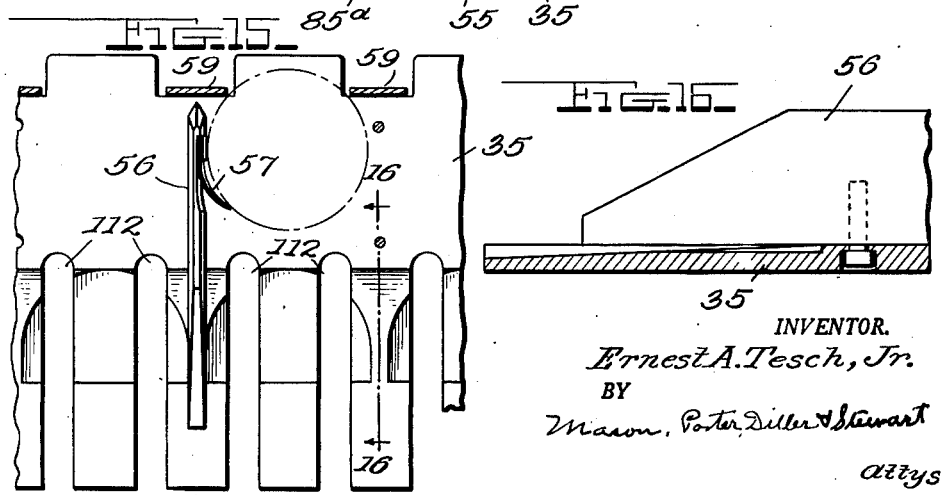

Sept. 2, 1952  E. A. TESCH, JR  2,609,110
JAR LID REMOVING MECHANISM FOR DRYING OVENS
Filed Aug. 11, 1949  14 Sheets-Sheet 10
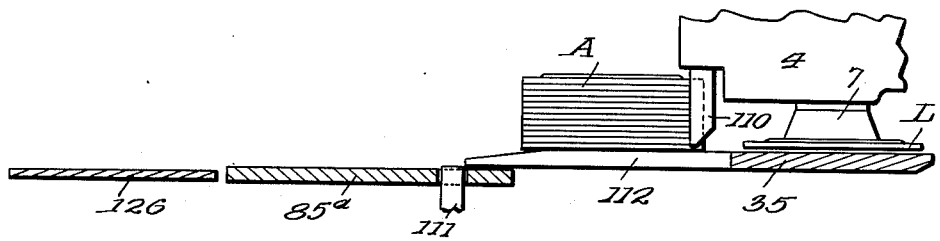
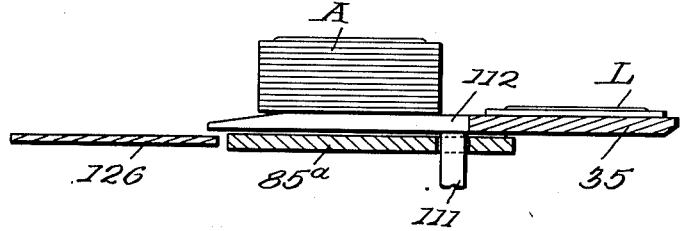
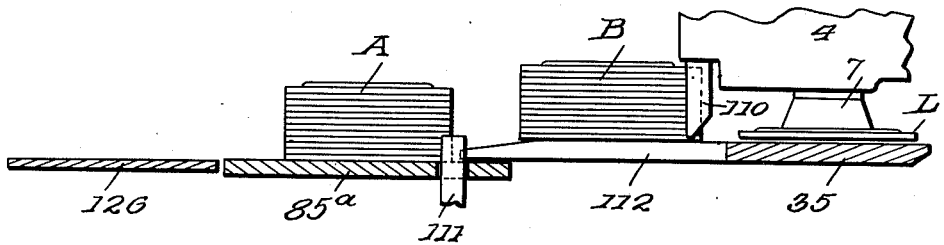
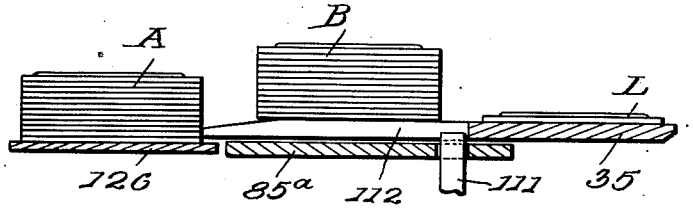
INVENTOR.
Ernest A. Tesch, Jr.
BY
Mason, Porter, Diller & Stewart
attys

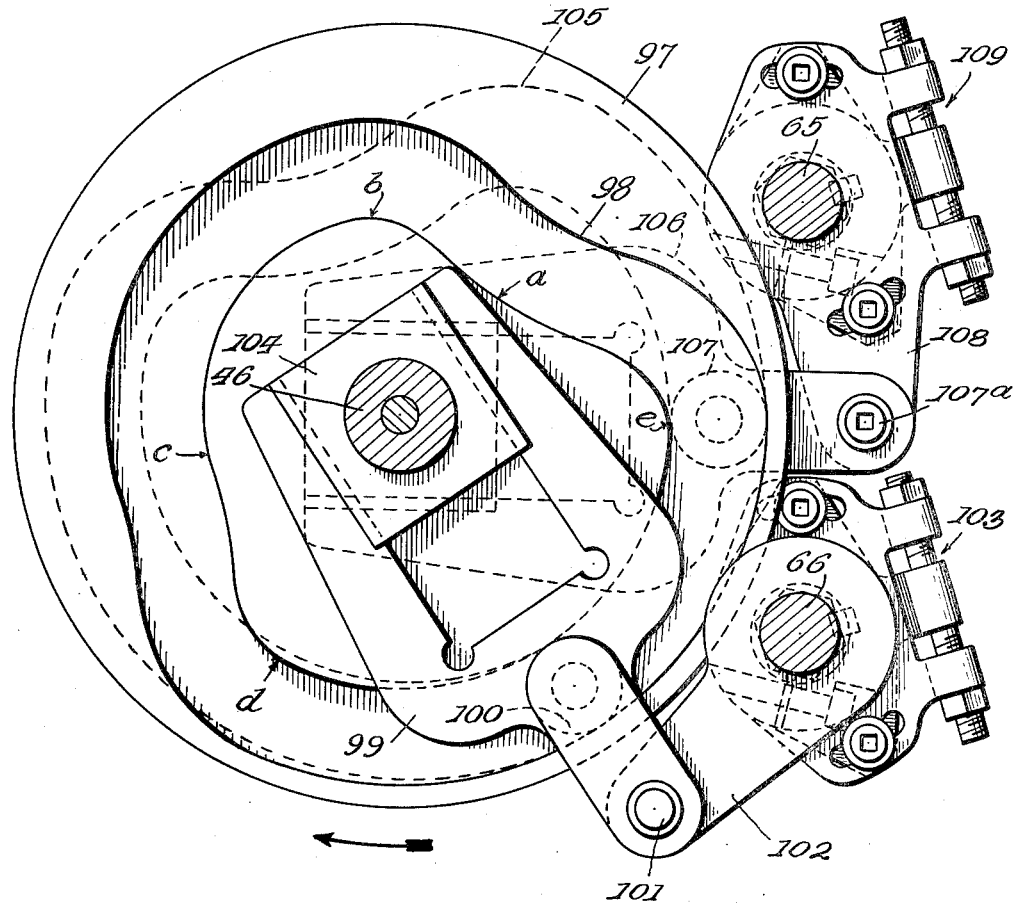

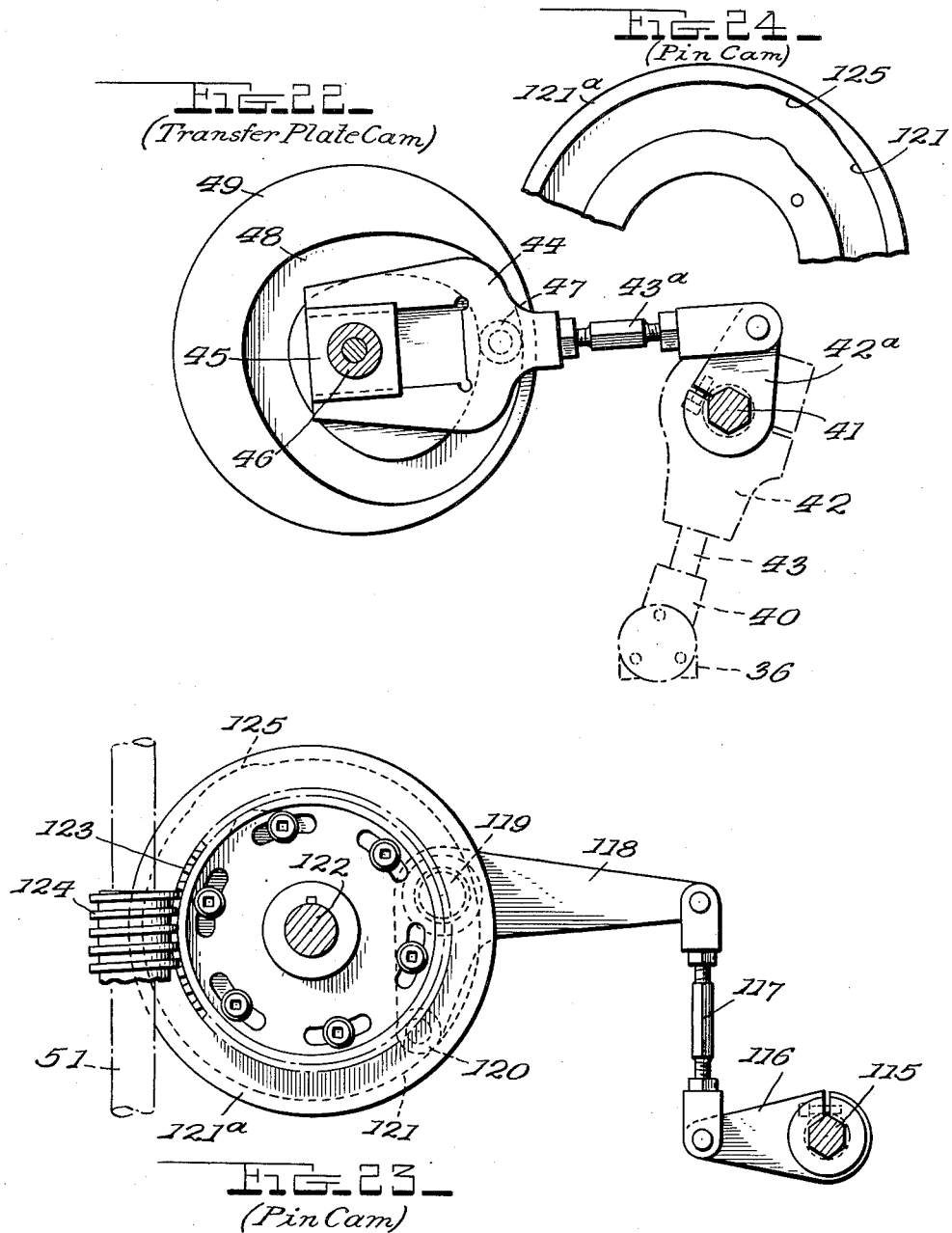

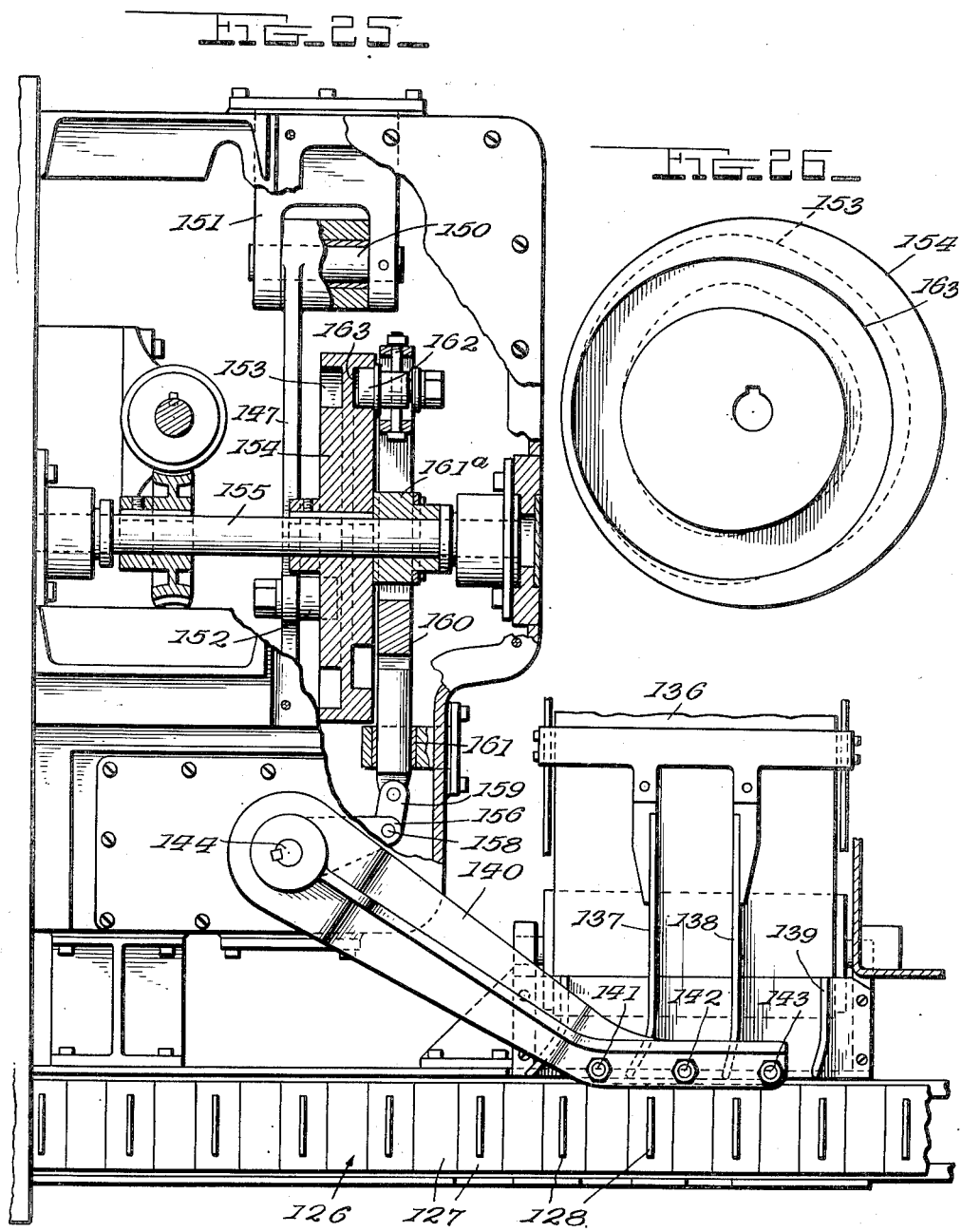

Sept. 2, 1952  E. A. TESCH, JR  2,609,110
JAR LID REMOVING MECHANISM FOR DRYING OVENS
Filed Aug. 11, 1949  14 Sheets-Sheet 14
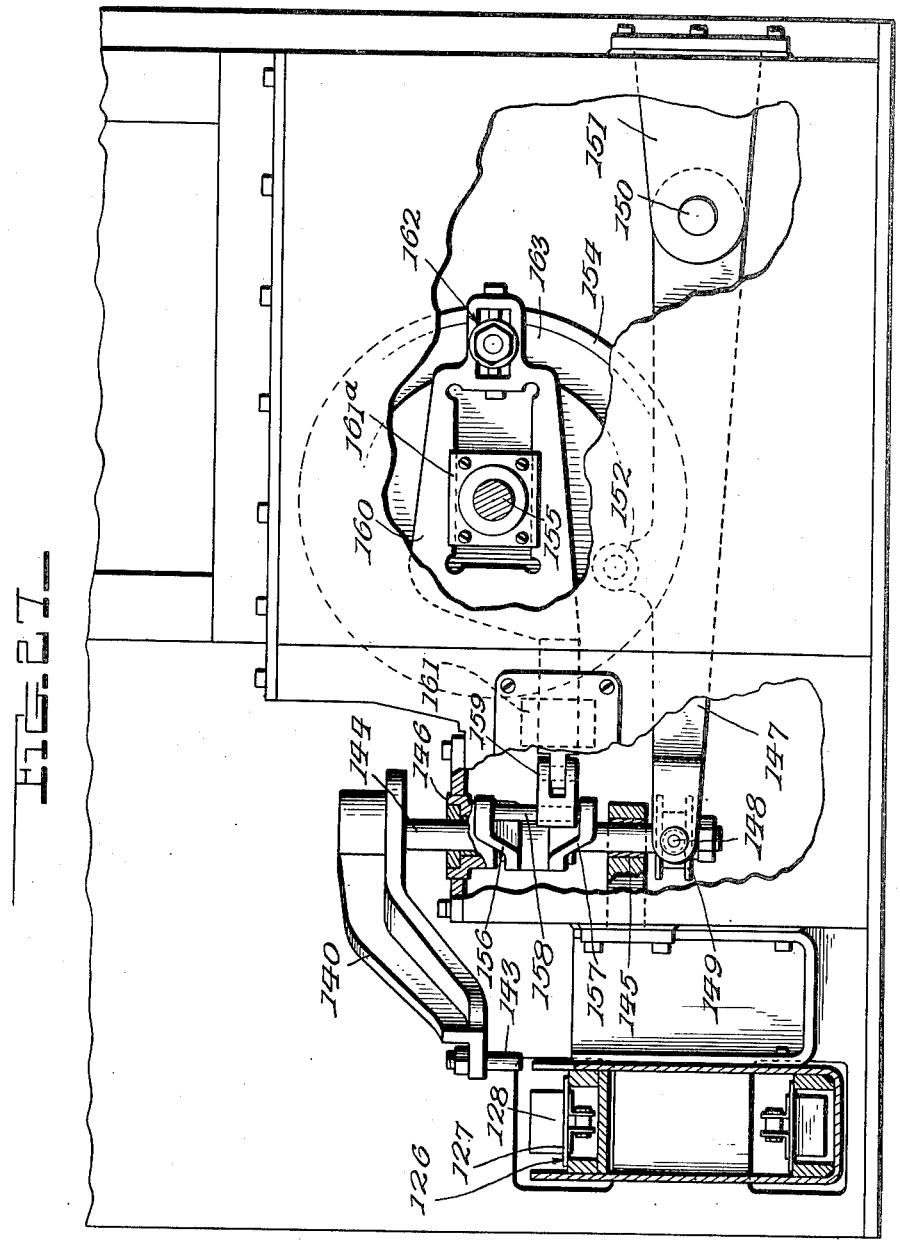
INVENTOR.
Ernest A. Tesch, Jr.
BY
Mason, Porter, Diller & Stewart
attys.

Patented Sept. 2, 1952

2,609,110

UNITED STATES PATENT OFFICE 2,609,110

JAR LID REMOVING MECHANISM FOR DRYING OVENS

Ernest A. Tesch, Jr., Chicago, Ill., assignor to Phoenix Metal Cap Co., Inc., Chicago, Ill., a corporation of New York Application August 11, 1949, Serial No. 109,693

16 Claims. (Cl. 214—6)

In my application, Serial No. 15,822, filed March 19, 1948, now Patent No. 2,600,138, I have shown a mechanism for removing jar caps or lids one at a time from a stack and for passing the caps or lids in succession along a coating roll for the application of a gasket forming material to the cap or lid.

In my application, Serial No. 46,067, filed August 25, 1948, I have shown a mechanism including a series of cap lifting units for simultaneously lifting a group of caps from the conveyor of the coating machine and for placing the caps on a moving tray of a drying oven.

The present invention has to do with a mechanism for simultaneously removing the lids from the moving trays of the drying oven after the gasket material has been set; piling the lids in stacks of a predetermined number and delivering the stacked lids to a wrapping machine.

An object of the invention is to provide a mechanism which includes a plurality of units operating simultaneously and independently for engaging and lifting the lids from a tray in a drying oven while said tray is moving.

A further object of the invention is to associate with each lid lifting unit a stacking plate on which the lids are deposited one after another in stacked formation by the lifting unit.

A further object of the invention is to provide a stack removing mechanism for each lifting unit which is so controlled that regardless of the number of up and down strokes of the lifting unit, the stack is removed when a predetermined number of lids have been placed in the stack.

A still further object of the invention is to provide a mechanism for transferring the stacked lids from the units into individual pockets of a continuously moving conveyor, which transfer mechanism is so timed relative to the traveling conveyor that a stack from each of the units may be simultaneously placed in a pocket in the conveyor.

A still further object of the invention is to provide a mechanism operating in timing with the conveyor carrying the stacked lids for transferring the stacked lids to another conveyor leading to the wrapping machine.

These and other objects will in part be obvious and will in part be hereinafter more fully disclosed.

In the drawings, which show by way of illustration one embodiment of the invention;

Figure 1 is a view partly in section and partly in top elevation with parts broken away to show the inner mechanism, said view showing a portion only of the drying oven;

Figure 1A is a similar view of a portion of the opposite side of the oven;

Figure 1B is a detail sectional view taken on the line 1B—1B on Figure 1A.

Figure 2 is a vertical view partly in section, partly in side elevation and with parts broken away to show the inner mechanism, said view showing a portion only of the left hand side of the oven;

Figure 3 is a view showing in end elevation the operating mechanism for the several units operating to remove the stacks from the trays one after another; stacking the lids and transferring the stacked lids to a conveyor;

Figure 5 is a separated view in perspective of the devices which constitute the suction cup reciprocating mechanism and the counting mechanism associated therewith;

Figure 6 is a side view of the operating cam in the counting mechanism which shifts the connection for reciprocating the suction cup;

Figure 7 is a plan view on a small scale showing the several elements in assembled position;

Figure 8 is a vertical sectional view showing the operating devices for raising and lowering a pick up suction cup, with the suction cup connected to the upper reciprocating device;

Figure 9 is a similar view showing the suction cup connected to the lower reciprocating device;

Figure 10 is a vertical sectional view through the head supporting the suction cup, said view being taken on the line 10, 10 of Figure 11;

Figure 11 is a plan view of the head shown in Figure 10 on a smaller scale;

Figure 12 is a sectional view on the line 12, 12 of Figure 2, showing a part of the mechanism for reciprocating a stacking plate;

Figure 13 is a vertical sectional view on the line 13, 13 of Figure 12;

Figure 14 is a sectional view on the line 14, 14 of Figure 2;

Figure 15 is a view partly in section and partly in plan of the reciprocating plate and the devices for positioning a stack on the plate;

Figure 16 is a sectional view on the line 16, 16 of Figure 15;

Figure 17 is a view showing more or less diagrammatically the stacking plate positioned for the suction cup to drop a lid picked up from the trays of the oven and also showing a stack of lids on the plate, which stack of lids has been held from movement as the plate moves forward to receive a lid;

Figure 18 is a similar view showing the plate retracted;

Figure 19 is a similar view showing the plate positioned to receive a lid, a stack on the plate and the stack removed from the plate by the restraining pins;

Figure 20 shows the initially formed stack as shifted onto the conveyor by the retracting of the plate;

Figure 21 is a view in side elevation showing one of the cams in full lines and the other one in broken lines which operate the upper and lower suction cup reciprocating devices;

Figure 22 is a plan view of the cam and the devices operated thereby for reciprocating the stacking plate;

Figure 23 is a view in side elevation of the cam and immediate devices for raising and lowering the pins which strip the stacked lids from the plate;

Figure 24 is a face view of a portion of the operating cam shown in dotted lines in Figure 23;

Figure 25 is a view partly in plan and partly in horizontal section of the mechanism for removing the stacked lids from the conveyor onto the belt which transfers the lids to the wrapping mechanism;

Figure 26 is a side view of the disk showing in full lines the cam which raises and lowers the take-away arm for removing the lids from the conveyor, and in dotted lines the cam for oscillating said arm;

Figure 27 is a view partly in end elevation and partly in vertical section with parts broken away to show some of the inner mechanism operating the arm which removes the stacked lids from the conveyor.

The invention has to do with a drying oven and in particular to a mechanism for removing jar lids from the trays of the oven, after the lids have been passed through the oven and the coating thereon has been set. A portion only of the oven is shown as it forms no part of the present invention. The oven is provided with conveyor chains 1 running over sprocket wheels 2, 2. Mounted on these chains are trays indicated at 3, 3. These trays are so constructed that as the chains pass over the wheels the trays will always remain in horizontal position. The trays extend from one side of the oven to the other and are of a length so as to receive a plurality of jar lids. In the present embodiment of the invention the trays are of sufficient length so that thirty lids may be placed thereon, side by side, with sufficient clearance between the same to permit the placing and removing of the lids without one interfering with the others.

Figure 2A:
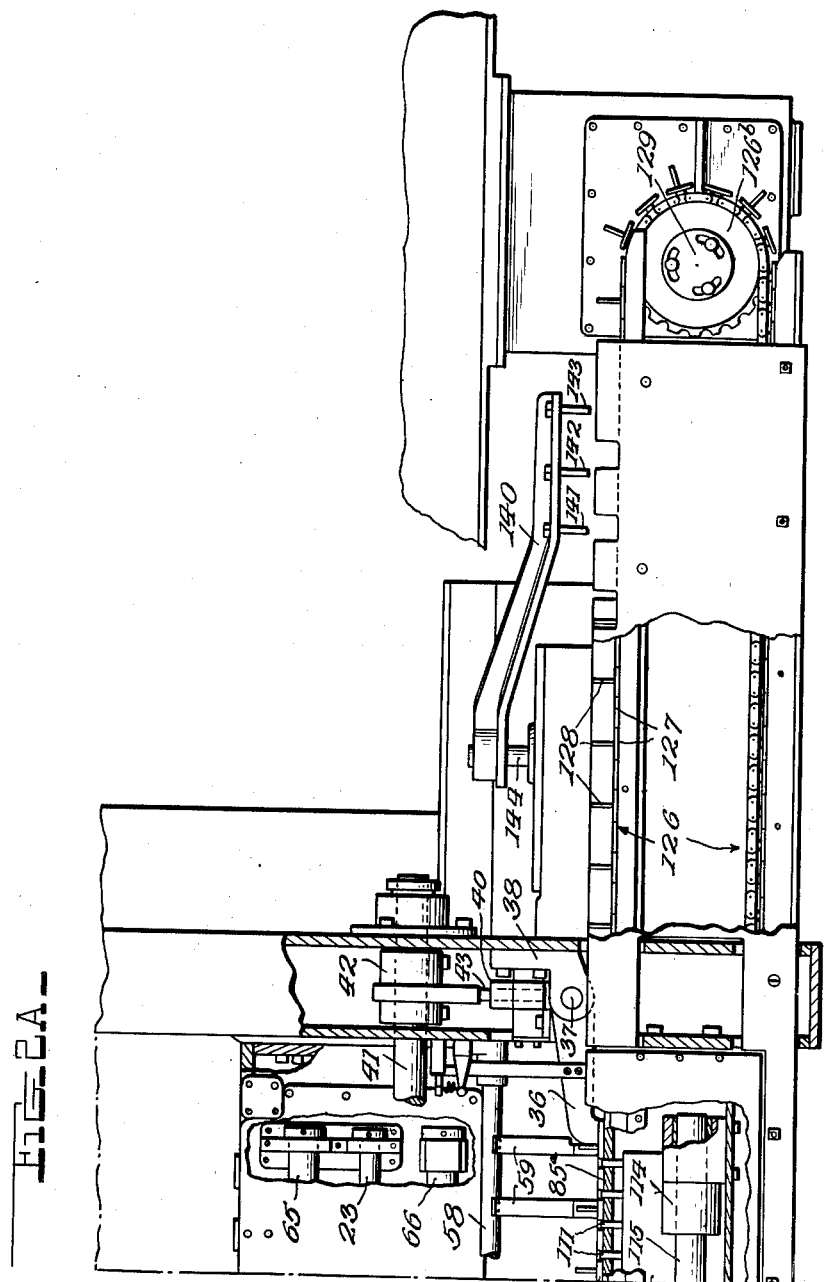
Figure 2A is a similar view of the right hand side of the oven.
Figure 4:
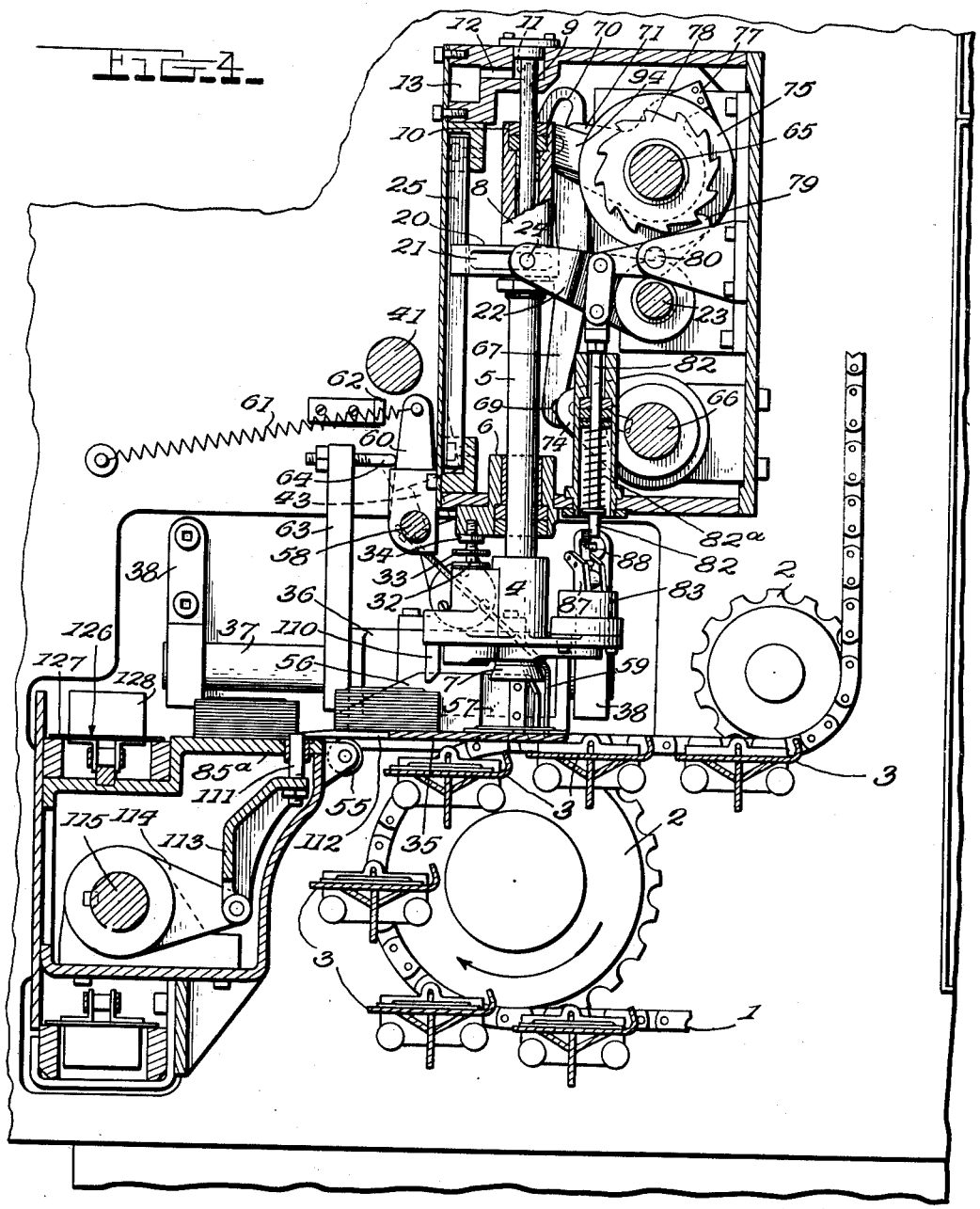
Figure 4 is a sectional view on the line 4—4 of Figure 2.

Referring to Figure 4, it will be noted that the sprocket wheels over which the chains of the oven run are so disposed that the tray moves beneath a pick-up head. This pick-up head is a part of a lid removing and stacking unit. There is a unit for each lid on a tray and if there are thirty lids then there will be thirty units. They are all alike in structure, but are independent of each other in their stacking operations.

The stacking unit includes a head 4 attached to a hollow shaft 5 mounted for reciprocations in bearing 6. This pick-up head carries a suction cup 7 attached to the underside thereof. The shaft 5 which reciprocates the head is provided with a hollow sleeve 8 at its upper end. A rod 9 fixed to the frame of the oven extends down into the sleeve and the sleeve will reciprocate on the rod. Suitable devices 10 are provided for making an air-tight joint between the rod and the sleeve 8. The rod is hollow and has an opening 11 connected by a passage 12 with the header 13. This header is common to all of the units and is connected to a suitable source of suction. This will create a vacuum in the hollow shaft 5 and in the chamber 14.

The head is provided with a valve seat 15 and the valve 17 is pressed by means of a spring 18 against the seat. The valve carries a stem 19 which extends down through an opening in the lower portion of the head and into the suction cup 7.

The shaft 5 is provided with a fixed collar 20 having slots 21 in the side face thereof. An arm 22 mounted for free oscillation on a shaft 23 is provided with a yoke at its free end carrying pins 24 which engage the slots 21. When this arm 22 is raised and lowered it will raise and lower the shaft 5, and this will raise and lower the entire head 4. This collar 20 engages a guide bar 25 which prevents any oscillations of the shaft as it moves up and down.

When the tray reaches a position directly beneath the suction cup, the suction cup has been brought down close to the lid and will be lowered into contact with the lid. As the suction cup is pressed down against the lid, it will expand so that the lid will contact the stem 19 of the valve 17, and raise it from its seat. This will place the suction cup under vacuum and it will grip the lid so that when the head is raised, the lid will be raised with it.

The pick-up head has a transverse passage 26 and a vertical passage 27 connected therewith. A threaded plug 28 closes the passage. The plug has a valve seat 29 with which a valve 30 is pressed into contact therewith by means of a spring 31. The valve 30 has a stem 32 which extends above the head and when the head reaches the upper end of its stroke, the valve stem 32 will engage the head of a screw 33 threaded into the bearing 6. The head of the screw may be adjusted and held in adjusted position by a lock nut 34. When the stem contacts this head 33 the valve will be opened and the passage 26 and also the suction cup connected to the atmosphere, and the lid carried by the cup will drop therefrom.

Associated with this pick-up head is a stacking plate 35. This stacking plate extends from side to side of the oven and is common to all of the pick-up units.

Referring to Figures 12 to 16 of the drawings, the stacking plate 35 is bolted to a supporting head 36 which is mounted for reciprocation on a shaft 37 carried by bracket arms 38, 38 secured to the frame of the machine. Mounted in the head 36 is a short shaft 39 which oscillates on an axis at right angle to the axis of the shaft 37. This shaft 39 carries a sleeve 40. Located above the sleeve 40 is an operating shaft 41 which extends from one side of the oven to the other. Keyed to this shaft is a sleeve 42 carrying a depending rod 43, which freely extends into the sleeve 40. This permits oscillation of the shaft 41 to move the supporting head 36 back and forth on the shaft 37, and this will cause the plate 35 to reciprocate back and forth.

At the opposite side of the oven there is a similar means for supporting the plate, and as noted above, the shaft 41 extends all the way across the oven and operates a supporting head for the plate at that side of the oven. On the end of the shaft 41 is an arm 42ª which is connected by a link 43ª with a forked member 44 (see Figure 22). This member 44 has a sliding connection with a block 45 freely supported on a shaft 46. The forked member 44 carries a roller 47 engaging a cam groove 48 in a cam disk 49. This cam disk 49 is fixed to the shaft 46 and mounted on the shaft 46 is a worm gear 49ª meshing with a spiral gear 50 carried by a vertical actuating shaft 51. This shaft carries a bevel gear 52 meshing with a bevel gear 53 which is operated from a suitable source of power through a timing connection 54. The plate 35 slides back and forth on rollers 55. These rollers are mounted on a bracket carried by a frame of the oven.

Referring again to Figure 4, the stacking plate 35 is shown as moved to its forward position beneath the suction cup on the pick-up head. The pick-up head is at the upper end of its stroke, the valve stem is contacted with the head 33, the valve 30 opened, releasing the suction, and the lid is dropped onto the stacking plate. The stacking plate with the lid thereon is then retracted so that the pick-up head can move down and pick up another lid from the tray as it moves beneath the suction cup.

The pick-up head is again lifted and the stacking plate moves underneath the suction cup, and the next lid is dropped directly onto the first-named lid. Thus, a stack of lids is formed. In the present embodiment of the invention twelve lids are stacked and this completes the stack.

To facilitate the even placing of the lids one on another in the form of a stack, the stacking plate is provided with a series of partitions 56.

In Figure 15, the plate is shown in plan view with one partition attached thereto. The others have been omitted for the sake of clearness. This partition is provided with a recess in one side wall thereof and a yieldable finger 57 is attached to the plate and projects therefrom so as to serve as a yielding retaining member for maintaining a uniform stack. The stack is indicated in broken lines in Figure 15.

Extending from side to side of the oven is a shaft 58. This shaft carries depending plates 59. The depending plates 59 are disposed so as to enter recesses in the edge portion of the stacking plate 35. The shaft 58 carries an upstanding arm 60 at one end thereof and a spring 61 normally swings the shaft in a counterclockwise direction until the arm 60 engages a stop 62. Mounted on the head 36 which carries the plate 35 is an upstanding member 63 carrying a pin 64, which when the stacking plate moves forward contacts with the arm 60 and turns the shaft in a clockwise direction, thus bringing the depending plates down into contact with the edge at the inner side of the recesses in the plate. These plates serve to place the lids in proper stacked formation with one directly above another.

The means for reciprocating the pick-up head will now be described in detail, referring in particular to Figures 5 to 9 inclusive. The means for reciprocating the pick-up head includes an upper shaft 65, which is oscillated back and forth, and a lower shaft 66, which is likewise oscillated back and forth. Pivotally mounted on the arm 22, which is connected to the shaft 5 carrying the pick-up head, is a shiftable member 67, said member 67 is provided with a recess 68 at its upper end and a recess 69 at its lower end. The pivotal connection between the shiftable member 67 and the arm 22 includes a pin indicated at 22a.

There is also, at the upper end of this member 67, a slot 70. Fixed to the shaft 65 is a rocker arm 71, which rocker arm carries a pin 72 which is adapted to engage the recess 68 in the shiftable member 67 when the upper end of said shifting member is moved in a clockwise direction into engagement with the pin as shown in Figure 8.

At this time the recess 69 is out of engagement with the pin 73 carried by a rocker arm 74 mounted on the lower oscillating shaft 66. This connection with the upper shaft will cause the arm 22 to be oscillated and raise and lower the pick-up head.

Mounted on the shaft 65 is a counting mechanism. This counting mechanism includes a disk 75 which is mounted for free rotation on the shaft 65. In the side face of this disk 75 are notches 76. There are twelve of these notches. One face of the notch is inclined to the face of the disk and the other is at right angles thereto. Mounted on the rocker arm 71 is a blade 77 which engages the side face of the disk 75 and serves as a pawl for turning the disk step by step.

Mounted on the disk 75 and turning therewith is a ratchet wheel 78. A pawl 79, pivoted at 80, is connected through links 81 to the rod 82, which is pressed downwardly by a spring 82a so as to hold the pawl 79 in engagement with the ratchet wheel (see Fig. 4). The rod 82 extends up through a sleeve mounted in the housing of the oven and the spring 82a bears against an abutment at its upper end which abutment is mounted in said sleeve. When the pawl 79 engages this ratchet 78 it will hold the disk from turning in a counterclockwise direction as viewed in Figures 4 and 5. As the arm 71 oscillates in a clockwise direction, thus raising the pick-up head, the blade 77 will engage in one of the notches 76 and turn the disk in a clockwise direction. Thus it is that the pawl 79 will move into the next tooth in the ratchet wheel and when the blade 77 is retracted or moved in a counterclockwise direction the disk 75 will be held from movement therewith. Thus the disk will be moved in a clockwise direction step by step.

If, however, the pawl 79 is moved out of engagement with the ratchet tooth, then there is nothing to hold the disk from counterclockwise movement when the blade 77 moves in a counterclockwise direction and, therefore, the disk 75 will move with the blade 77. In other words, it moves forward with the blade and backward with the blade and this is an idle movement so far as stepping the disk around.

Referring now to Figure 10, it will be noted that the pick-up head has a lateral extension 83 in which there is a chamber 84. Located in this chamber is a Sylphon bellows 85. The interior of this bellows is connected through port 86 with the passage 26. When the pick-up head moves down and the suction cup contacts with a lid, this passage 26 will be maintained under suction and the suction will collapse the Sylphon bellows. The extension 83 is provided with an upstanding arm 87. An abutment member 88 is pivoted at 89 to said arm. This member is also pivoted at 90 to a member 91 which is attached to and moves with the Sylphon bellows. When the bellows is collapsed by a suction on the passage 26, this abutment member 88 will be swung to the dotted line position. When in full line position, there is no suction on the pick-up head, and as the pick-up head moves upwardly, this abutment member 88 will contact with the lower end of the rod 82 and will move said rod upward, thus releasing the pawl 79 from the ratchet wheel 78. When, however, the lid is picked up by the suction cup and the bellows collapsed, then the abutment member will be moved to the dotted line position, so that it will not contact with the rod and the spring will hold the pawl in engagement with the ratchet wheel.

From the above, it will be noted that when there is a lid picked up by the suction cup the ratchet wheel will be turned one step in its circular movement. When, however, there is no lid to be picked up by the suction cup then the pawl 79 will be disengaged from the ratchet and the oscillation of the blade 77 will not turn the disk 75 through a step movement.

On the face of the disk 75, opposite the ratchet wheel 78, there is a cam groove 92. A cam roller 93, carried by the member 94 runs in said groove. The member 94 has an oblong opening 95 therethrough, through which the shaft 65 passes. At the outer end of the member 94 is a pin 96 which engages the slot 70 in the shiftable member 67. This cam groove 92 is so shaped that when the disk has been moved through twelve steps, then the roller will move the member 94 outward, shifting the member 67 so that the pin 73 carried by the arm 74 will engage the recess 69. The pick-up head will then be reciprocated for one stroke by the lower shaft. As soon as the disk 75 is moved through the next step in its rotation then the roller 93 will move off from the high point of the cam 92 and the shiftable member 67 will be again shifted so that the recess 68 will engage the pin 72.

This shift over from one reciprocating member to the other for reciprocating the pick-up head occurs just after twelve lids have been picked up and placed in a stack.

The cams for oscillating the shafts 65 and 66 and the mechanism associated therewith are shown in detail in Figure 21. The disk 97 is carried by the shaft 46. On one face of the disk is a cam groove 98 which is shown in full lines in Figure 21. Associated with this cam is a radial reciprocating member 99 carrying a roller 100 which runs in the cam groove 98. This radially reciprocating member is pivoted at 101 to an arm 102 fixed to the shaft 66 by an adjustable means 103. This radially moving member 99 has its inner end forked so as to engage a block 104 freely mounted on the shaft 46.

On the other side of the disk 97 is a cam groove 105 which is shown in dotted lines in Figure 21. There is also a radially reciprocating member 106 carrying a roller 107 which runs in the cam groove 105. This reciprocating member 106 is pivoted at 107a to an arm 108 connected to the shaft 65 through an adjustable mechanism 109. The cam groove 98 rotates in the direction of the arrow (Figure 21). From the point $d$ to the point $e$, the groove is substantially concentric and while this portion of the groove is passing the roller the shaft 66 will be at a dwell. If the shaft 66 is connected up to the pick-up head, then the pick-up head will be at the upper end of the stroke, and will be at a dwell. As the cam disk 97 continues to rotate, the shaft 66 will be oscillated in a clockwise direction and the pick-up head moved to the lower end of its stroke.

The point $a$ indicates the position of the cam groove when the pick-up head is at the lower end of its stroke. The pick-up head rises rapidly until the point $b$ is reached and then from $b$ to $c$ it is at a dwell. At this time the pick-up head has moved to the position shown in Figure 17. It has picked up a lid which is held by the suction cup.

Mounted on the pick-up head 4 are depending fingers 110. There are two of these fingers and when the head dwells at the position shown in Figure 17, these fingers lie right close to the stack. During this dwell the stacking plate 35 is moved forward by the cam 49 shown in Figure 22. As viewed in this figure, the plate is at the forward end of its stroke. The cam is so shaped that the plate moves quickly forward to the end of its stroke, and then it dwells for a short period while the lid picked up by the suction cup is dropped onto the stacking plate. When the stacking plate has reached the forward position shown in Figure 17, the suction cup moves on up to the upper end of its stroke. At this time the portion of the cam groove 98 from $c$ to $d$ is passing the roller and this quickly moves the pick-up head to the upper end of its stroke where the stem 32 of the valve 30 contacts with the head of the screw 33 which opens the valve and releases the suction so that the lid is dropped onto the stacking plate.

While the pick-up head is at the upper end of its stroke, the cam 75 comes into action and the roller 93 moves off from the high point 75a of the cam and this will shift the shiftable member 67 and cause the recess 68 to engage the pin 72 on the rocker arm 71. It is noted that the recess 68 has a forwardly projecting shoulder 68a and the recess 69 has a similar shoulder 69a. These shoulders leading into the recesses facilitate the connecting of the reciprocable members to the respective operating pins 72 and 73 therefor.

The cam groove 105 with which the roller 107 engages is shaped similar to the cam groove 98 except that the shaft 65 when connected to the head moves the head down quickly to pick up a lid and it moves upwardly to a point near the releasing of the vacuum on the suction head. When the stacking plate has moved underneath the suction cup then the head reaches the upper end of its stroke and the suction is broken and the lid is dropped onto the stacking plate. The shaft 65 continues to be active in the operating of the head until twelve lids have been stacked on the stacking plate and then the connection is shifted to the lower shaft, which, on its next stroke, is given a dwell as described above so that the stack is restrained from movement and the stacking plate slides along underneath the stack to the position shown in Figure 17.

There are pins 111 mounted for reciprocation in bushings in the frame 85a of the machine. These pins move up through slots 112. There are two slots for each stacking unit (see Figure 15). The pins are carried by a bar 113 extending all the way across the oven from one side thereof to the other. This bar 113 is supported by arms 114 on the shaft 115. The shaft 115 is provided with an arm 116, which is connected by a link 117 to a rocker 118 (see Figure 23). The rocker is pivoted on the frame at 119. This rocker carries a roller 120 which runs in a cam groove 121 in a cam disk 121a mounted on the shaft 122. Adjustably connected to this disk is a worm gear 123 which is operated by spiral gear 124.

The cam groove 121 has an offset therein indicated at 125 (Figure 24). The pins are normally lowered, but they are raised once quickly by this offset 125 in the cam groove. Referring to Figure 18, it will be noted that the stacking plate is at the rear end of its stroke and the stack A is on the rear portion of the stacking plate. A single lid L has been dropped onto the stacking plate for the beginning of a new stack. While the stacking plate has the stack A on the rear portion thereof, the pins 111 are raised to the position shown in Figure 19. These pins, as noted, move up through the slots 112 in the stacking plate.

When the stacking plate moves forward these pins will restrain the forward movement of the stack A and the stacking plate will slide out from beneath the same, permitting the stack to rest on the frame plate 85ª.

As shown in Figure 19, this shifting of the stack A took place after another stack had been completed as indicated at B, and the stack B has been shifted back onto the rear portion of the stacking plate by the dwell in the pick-up head as indicated in Figure 17.

Traveling along in front of all of the pick-up units is a conveyor 126. The conveyor is in the form of a series of links carrying plates 127. These plates, when the chain is traveling horizontally contact and thus serve as a support for the stacked lids. Certain of the plates have partitions 128 forming pockets to receive the stacked lids.

Referring again to Figure 19, it will be noted that the stack A has been pushed onto the frame 85ª and as the stacking plate 35 is retracted it will engage the stack and push it onto the conveyor 126. All of the units discharge their completed stacks onto this conveyor. Assuming that there are thirty units, and the tray is full of lids, and each suction cup picks up a lid on each stroke thereof. When the heads have made twelve strokes a stack will be completed. These completed stacks will be simultaneously shifted to the rear portion of the stacking plate, thence to a position on the frame, and thence onto the conveyor. For every twelve reciprocations of the heads there may be thirty stacks completed, and these completed stacks will be simultaneously shifted onto the conveyor. In order that there may be empty pockets on the conveyor to receive simultaneously thirty stacks, the conveyor is operated at two and one-half times the period required for the building of the stack under normal conditions. The conveyor 126 runs over a sprocket 126ª at one side of the oven and extends beyond the other side of the oven where it runs over a sprocket 126ᵇ. The conveyor 126 is operated by a shaft 129 connected to the sprocket 126ᵇ and carries a worm gear 130 which engages a spiral gear 131 on a shaft 132. This shaft carries a bevel gear 133 meshing with a bevel gear 134 on a driving shaft 135, which is operated in timing with the oven mechanism.

Extending along the side of the oven is a conveyor belt 136 which leads to a wrapper for the wrapping of the stacks. The conveyor belt travels in a direction at right angles to the direction of the travel of the conveyor 126. Closely associated with the belt and the conveyor are guiding members 137, 138 and 139. The stacks are stripped from the pockets on the conveyor three at a time in between these respective guiding members. This places the stacks a substantially uniform distance apart on the conveyor belt laterally of the conveyor.

The means for transferring the stacked lids from the conveyor onto the belt includes an arm 140 carrying depending fingers 141, 142 and 143. This arm 140 is mounted on a vertical shaft 144. The shaft is raised and lowered and is also oscillated so as to give what might be called four motions to the arm 140. That is, the arm moves from the position shown in Figure 25 where the pins are above the conveyor laterally across the conveyor 126 to the outer side thereof. Then it moves downward and then it moves across the conveyor, transferring the stacks from the conveyor between the guides referred to. After it has completed the lateral movement transferring the stacked lids to the belt, then it raises so as to clear the stacks that are brought into position for discharge, and then it moves laterally outwardly over the stacks for its next cycle of movement.

The mechanism for raising and lowering and oscillating the shaft 144 is shown in detail in Figures 25, 26 and 27. This shaft is mounted in suitable bearings 145 and 146 carried in a framework attached to the oven. The shaft is raised and lowered by a lever 147. The lever carries pins 148 engaging a groove in a collar 149 fixed to the shaft. The lever is pivoted at 150 to a bracket 151. The lever carries a roller 152 running in a cam groove 153 in a cam disk 154. The disk 154 is mounted on a shaft 155 which is rotated by suitable devices connected to the oven drying mechanism. This cam groove 153 is so shaped that it raises the arm, then there is a dwell in the raising movement after which it moves the arm to the lower position of oscillation and dwells in this position. Rigidly attached to the shaft 144 for oscillating the arm are two brackets 156 and 157. There is a pin 158 carried by these two brackets, said pin extending slidably through a link 159. This link is connected to a bar 160. The bar is mounted so as to slide back and forth in an endwise direction in a fixed guide 161 and on a block 161ª, the latter being freely mounted on the shaft 155. The bar carries roller 162, which runs in a cam groove 163 in the disk 154. This cam groove is so shaped as to oscillate the arm and move it laterally across the conveyor 126 for transferring stacked lids onto the conveyor belt leading to the wrapping machine, and then it is moved to the upper end of its cycle so as to pass over the stacks into a position for transferring another group of stacked lids.

A brief resume will be given of the operation of the various mechanisms. The lids, after being coated, are placed on the trays of a drying oven and at a certain part in the travel of the tray the lids are brought beneath a series of pick-up units, each including a suction cup, and there is one unit for each lid on a tray when a tray is completely filled with lids. The pick-up head carrying the cup moves down to bring the cup into engagement with the lid and as it contacts the lid a vacuum source is connected to the cup so that the lid is attached to the cup and lifted thereby.

Each unit has a stacking plate associated therewith which moves beneath the path of travel of the suction cup so that when the pick-up head reaches the upper end of its stroke the suction will be broken and the lid drop onto the stacking plate. This continues building up a stack until a predetermined number, twelve in the present instance, has been stacked on the plate. The plate, of course, is retracted in timing with the movement of the pick-up head so as to permit the suction cup to move down and pick up another lid from the next tray.

After twelve lids have been placed in a stack on the stacking plate, then the means for reciprocating the head is changed to another shaft which has a slightly different timing whereby the pick-up head, after it has moved the cup sufficiently to clear the stacking plate, dwells. The head carries restraining pins which are disposed in the path of movement of the stack, so that the stacking plate will move forward to receive another lid and begin to build a new stack. This stacking plate is slotted, and pins move up through the slots in the plate so as to restrain the movement of the stack on the rear portion of the plate and the plate moves out from beneath the same so that the stack is dropped onto the frame of the machine.

On the retracting movement of the stacking plate the stack will be again shifted onto the conveyor. The stacks of all the operating units are placed on this conveyor and when the conveyor reaches a certain zone in its travel, there is a transfer mechanism which transfers a group of stacks from the conveyor to a take-away belt, and this take-away belt delivers the stacked lids to a wrapping machine. A transfer of the reciprocating means for the pick-up head from one shaft to another is brought about by a train of mechanisms which includes a counter, which counter is only turned when the suction cup picks up a lid and, therefore, this shifting of the operating mechanism only occurs when a stack has been completed.

It is obvious that many changes in the details of construction of the mechanisms described may be made without departing from the invention as set forth in the appended claims.

I claim:

1. A lid removing mechanism for lifting lids from the trays of a drying oven comprising a series of vacuum controlled lifting units operating independently and simultaneously to remove the lids from a tray, mechanism associated with each lifting unit and controlled by the vacuum on said unit for placing the lids in stacks, means for removing each stack from its lifting unit when the stack contains a predetermined number of lids, a conveyor common to all of said units, and mechanism for transferring the stacked lids onto said conveyor.

2. A lid removing mechanism for lifting lids from the trays of a drying oven comprising a series of vacuum controlled lifting units operating independently and simultaneously to remove the lids from a tray, mechanism associated with each lifting unit and controlled by the vacuum on said unit for placing the lids in stacks, means for removing each stack from its lifting unit when the stack contains a predetermined number of lids, a conveyor common to all of said units and mechanism for transferring the stacked lids onto said conveyor, said conveyor being positioned and timed to receive simultaneously stacks from any or all of said units.

3. A lid removing mechanism for lifting lids from the trays of a drying oven comprising a series of vacuum controlled lifting units operating independently and simultaneously to remove the lids from a tray, mechanism associated with each lifting unit and controlled by the vacuum on said unit for placing the lids in stacks, means for removing each stack from its lifting unit when the stack contains a predetermined number of lids, a conveyor common to all of said units, and mechanism for transferring the stacked lids onto said conveyor, each lifting unit including a counting mechanism and means for rendering the counting mechanism inactive unless a lid is picked up and stacked.

4. A lid removing mechanism for lifting lids from the trays of a drying oven comprising a series of lifting units operating independently and simultaneously to remove the lids from a tray, each lifting unit including a pick-up head carrying a suction cup, means for moving said pick-up head to place the suction cup in contact with a lid on a tray and for raising said lid vertically from the tray, a stacking plate, means for reciprocating said plate across the path of travel of said cup when the cup is in the upper part of its stroke, and means for releasing the lid from the cup so that the lid will drop onto said plate or other lids carried thereon.

5. A lid removing mechanism for lifting lids from the trays of a drying oven comprising a series of lifting units operating independently and simultaneously to remove the lids from a tray, each lifting unit including a pick-up head carrying a suction cup, means for moving said pick-up head to place the suction cup in contact with a lid on a tray and for raising said lid vertically from the tray, a stacking plate, means for reciprocating said plate across the path of travel of said cup when the cup is in the upper part of its stroke, and means for releasing the lid from the cup so that the lid will drop onto said plate or other lids carried thereon, and means positioned in the path of the stack when a predetermined number of lids have been stacked for restraining the stack from movement while the plate slides forward beneath the cup for the formation of another stack.

6. A lid removing mechanism for lifting lids from the trays of a drying oven comprising a series of lifting units operating independently and simultaneously to remove the lids from a tray, each lifting unit including a pick-up head carrying a suction cup, means for moving said pick-up head to place the suction cup in contact with a lid on a tray and for raising said lid vertically from the tray, a stacking plate, means for reciprocating said plate across the path of travel of said cup when the cup is in the upper part of its stroke, and means for releasing the lid from the cup so that the lid will drop onto said plate or other lids carried thereon, and means positioned in the path of the stack when a predetermined number of lids have been stacked for restraining the stack from movement while the plate slides forward beneath the cup for the formation of another stack, a conveyor common to all of said units, and mechanism for transferring the stacked lids onto said conveyor, said conveyor being positioned and timed to receive simultaneously stacks from any or all of the units.

7. A lid removing mechanism for lifting lids from the trays of a drying oven comprising a series of lifting units operating independently and simultaneously to remove the lids from a tray, each lifting unit including a pick-up head carrying a suction cup, means for moving said pick-up head to place the suction cup in contact with a lid on a tray and for raising said lid vertically from the tray, a stacking plate, means for reciprocating said plate across the path of travel of said cup when the cup is in the upper part of its stroke, and means for releasing the lid from the cup so that the lid will drop onto said plate or other lids carried thereon, each lifting unit including a counting mechanism, means for rendering the counting mechanism inactive unless a lid is picked up and stacked.

8. A lid removing mechanism for lifting lids from the trays of a drying oven comprising a series of vacuum controlled lifting units operating independently and simultaneously to remove the lids from a tray, means associated with each lifting unit and controlled by the vacuum on said unit for placing the lids in stacks, means for removing each stack from its lifting unit when the stack contains a predetermined number of lids, a conveyor common to all of said units, mechanism for transferring the stacked lids onto said conveyor, said conveyor being positioned and timed to receive simultaneously stacks from any or all of the units, a belt associated with said conveyor and leading to a wrapping machine, and means for simultaneously removing a plurality of stacks from the conveyor onto said belt.

9. A lid removing mechanism for lifting lids from the trays of a drying oven comprising a series of lifting units operating independently and simultaneously to remove the lids from a tray, each unit including a pick-up head carrying a suction cup, means for reciprocating the pick-up head vertically for moving the cup into engagement with a lid on an oven tray for lifting the same therefrom, means for connecting said suction cup with a source of vacuum when the cup contacts the lid, and means for releasing the vacuum on the cup when the pick-up head reaches the upper end of its stroke, a stacking plate, means for reciprocating said plate across the path of travel of the cup when the cup is in the upper part of its stroke so that the lid dropped from the cup will be received by said stacking plate.

10. A lid removing mechanism for lifting lids from the trays of a drying oven comprising a series of lifting units operating independently and simultaneously to remove the lids from a tray, each unit including a pick-up head carrying a suction cup, means for reciprocating the pick-up head vertically for moving the cup into engagement with a lid on an oven tray for lifting the same therefrom, means for connecting said suction cup with a source of vacuum when the cup contacts the lid, means for releasing the vacuum on the cup when the pick-up head reaches the upper end of its stroke, a stacking plate, means for reciprocating said plate across the path of travel of the cup when the cup is in the upper part of its stroke so that the lid dropped from the cup will be received by said stacking plate, and means whereby the lids stacked on one another on said plate will be removed from said plate when a predetermined number of lids have been stacked on the plate.

11. A lid removing mechanism for lifting lids from the trays of a drying oven comprising a series of lifting units operating independently and simultaneously to remove the lids from a tray, each unit including a pick-up head carrying a suction cup, means for reciprocating the pick-up head vertically for moving the cup into engagement with a lid on an oven tray for lifting the same therefrom, means for connecting said suction cup with a source of vacuum when the cup contacts the lid, means for releasing the vacuum on the cup when the pick-up head reaches the upper end of its stroke, a stacking plate, means for reciprocating said plate across the path of travel of the cup when the cup is in the upper part of its stroke so that the lid dropped from the cup will be received by said stacking plate, each lifting unit including a counting mechanism and means for rendering the counting mechanism inactive unless a lid is picked up and stacked on said stacking plate, and means controlled by said counting mechanism whereby when a predetermined number of lids have been stacked on said plate, said stack will be removed to permit the formation of a new stack on said plate.

12. A lid removing mechanism for lifting lids from trays of a drying oven comprising a series of lifting units operating independently and simultaneously to remove the lids from a tray, each unit including a pick-up head carrying a suction cup adapted to engage a lid on an oven tray for lifting the same from the tray, means for placing the cup under vacuum when it contacts the lid, two independently operated actuating shafts, devices adapted to be connected alternately to said actuating shaft for reciprocating the pick-up head, a counting mechanism for shifting the connection of said devices from one shaft to the other, and means for rendering the counting mechanism inactive unless a lid is picked up by the suction cup, whereby the shifting of the connection from one shaft to the other occurs when a predetermined number of lids have been lifted from a tray.

13. A lid removing mechanism for lifting lids from trays of a drying oven comprising a series of lifting units operating independently and simultaneously to remove the lids from a tray, each unit including a pick-up head carrying a suction cup adapted to engage a lid on an oven tray for lifting the same from the tray, means for placing the cup under vacuum when it contacts the lid, two independently operated actuating shafts, devices adapted to be connected alternately to said actuating shaft for reciprocating the pick-up head, accounting mechanism for shifting the connection of said devices from one shaft to the other, and means controlled by the vacuum on the suction cup for rendering the counting mechanism inactive unless a lid is picked up by the suction cup, whereby the shifting of the connection from one shaft to the other occurs when a predetermined number of lids have been lifted from a tray.

14. A lid removing mechanism for lifting lids from trays of a drying oven comprising a series of lifting units operating independently and simultaneously to remove the lids from a tray, each unit including a pick-up head carrying a suction cup adapted to engage a lid, means for placing the cup under vacuum when it contacts the lid, two independently operated actuating shafts, devices adapted to be connected alternately to said actuating shaft for reciprocating the pick-up head, a counting mechanism for shifting the connection of said devices from one shaft to the other, and means controlled by the vacuum on the suction cup for rendering the counting mechanism inactive unless a lid is picked up by the suction cup, whereby the shifting of the connection from one shaft to the other occurs when twelve lids have been lifted from a tray, a stacking plate, means for reciprocating the stacking plate across the path of travel of the cup when the cup is at the upper part of its stroke, and means for releasing the suction on the cup so that the lid carried thereby will drop onto the plate or another lid thereon.

15. A lid removing mechanism for lifting lids from trays of a drying oven comprising a series of lifting units operating independently and simultaneously to remove the lids from a tray, each unit including a pick-up head carrying a suction cup adapted to engage a lid, means for placing the cup under vacuum when it contacts the lid, two independently operated actuating shafts, devices adapted to be connected alternately to said actuating shaft for reciprocating the pick-up head, a counting mechanism for shifting the connection of said devices from one shaft to the other, and means controlled by the vacuum on the suction cup for rendering the counting mechanism inactive unless a lid is picked up by the suction cup, whereby the shifting of the connection from one shaft to the other occurs when twelve lids have been lifted from a tray, a stacking plate, means for reciprocating the stacking plate across the path of travel of the cup when the cup is at the upper part of its stroke, and means for releasing the suction on the cup so that the lid carried thereby will drop onto the plate or another lid thereon, said pick-up head being given retarded movement by its operating shaft after the completion of the stack for positioning devices carried by said head in the path of the stack for shifting its position on the stacking plate to permit a new stack to be formed on said plate.

16. A lid removing mechanism for lifting lids from trays of a drying oven comprising a series of lifting units operating independently and simultaneously to remove the lids from a tray, each unit including a pick-up head carrying a suction cup adapted to engage a lid, means for placing the cup under vacuum when it contacts the lid, two independently operated actuating shafts, devices adapted to be connected alternately to said actuating shaft for reciprocating the pick-up head, a counting mechanism for shifting the connection of said devices from one shaft to the other, and means controlled by the vacuum on the suction cup for rendering the counting mechanism inactive unless a lid is picked up by the suction cup, whereby the shifting of the connection from one shaft to the other occurs when twelve lids have been lifted from a tray, a stacking plate, means for reciprocating the stacking plate across the path of travel of the cup when the cup is at the upper part of its stroke, and means for releasing the suction on the cup so that the lid carried thereby will drop onto the plate or another lid thereon, said pick-up head being given retarded movement by its operating shaft after the completion of the stack for positioning devices carried by said head in the path of the stack for shifting its position on the stacking plate to permit a new stack to be formed on said plate, pins movable through slots in the stacking plate at every twelfth reciprocation of the pick-up head for transferring the stack from the stacking plate onto a stationary supporting plate common to all of said pick-up units, and a conveyor associated with said supporting plate and timed to receive stacks from any or all of said units pushed from said supporting plate onto the conveyor by the retracting movement of the stacking plate.

ERNEST A. TESCH, Jr.

REFERENCES CITED

The following references are of record in the file of this patent:

UNITED STATES PATENTS

| Number | Name | Date |
|---|---|---|
| 1,057,815 | Fenlason | Apr. 1, 1913 |
| 1,600,022 | Van Heek | Sept. 14, 1926 |
| 2,424,093 | Harred | July 15, 1947 |
| 2,563,450 | Battey | Aug. 7, 1951 |